United States Patent
Hartman et al.

(10) Patent No.: US 6,779,344 B2
(45) Date of Patent: Aug. 24, 2004

(54) CONTROL SYSTEM AND METHOD FOR TURBOCHARGED THROTTLED ENGINE

(75) Inventors: William Lyle Hartman, Waterloo, IA (US); Donald Lee McCaw, Dike, IA (US); Daniel James Podnar, San Antonio, TX (US); John Thomas Kubesh, San Antonio, TX (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/327,241

(22) Filed: Dec. 20, 2002

(65) Prior Publication Data

US 2004/0118117 A1 Jun. 24, 2004

(51) Int. Cl.$^7$ ............................................. F02D 23/00
(52) U.S. Cl. .............................. 60/600; 60/611; 60/602
(58) Field of Search ........................... 60/600–603, 611; 123/564

(56) References Cited

U.S. PATENT DOCUMENTS

| | | | |
|---|---|---|---|
| 4,763,475 A | * 8/1988 | Toshio et al. | 60/602 |
| 5,526,645 A | * 6/1996 | Kaiser | 60/611 |
| 5,701,741 A | * 12/1997 | Halsall | 60/602 |
| 5,724,813 A | * 3/1998 | Fenelon et al. | 60/611 |
| 6,055,811 A | * 5/2000 | Maddock et al. | 60/600 |
| 6,311,493 B1 | * 11/2001 | Kurihara et al. | 60/600 |
| 6,318,083 B1 | * 11/2001 | Machida et al. | 60/601 |
| 6,408,624 B1 | * 6/2002 | Books et al. | 60/601 |
| 6,609,372 B2 | * 8/2003 | Maddock et al. | 60/600 |

FOREIGN PATENT DOCUMENTS

FR  2 655 38 A1  * 6/1991  ........... F02B/37/12

OTHER PUBLICATIONS

Deere & Co., 6081H Natural Gas Engine, 2 pages, Jan. 2002.
Cummins, Natural Gas Engines, 9 pages, May 1998.
Southwest Research Institute, Gas Engine Development, 6 pages, Sep. 1994.

* cited by examiner

Primary Examiner—Thomas Denion
Assistant Examiner—Thai-Ba Trieu

(57) ABSTRACT

A control system controls a turbo-charged trottled engine. The control system includes a throttle between the compressor and the engine, a wastegate communicated with exhaust upstream and downstream from the turbine, and a control unit for controlling the throttle and the wastegate. The control unit generates a desired air mass value per engine stroke as a function of a desired fuel flow amount and a stored compressor surge characteristic, generates a desired manifold air pressure value as a function of the desired air mass value and sensed engine parameters, and controls the throttle so that actual manifold air pressure matches the desired manifold air pressure. The control unit also generates a desired pressure boost value as a function of the desired manifold pressure value and a stored compressor surge characteristic, and controls the wastegate so that an actual boost pressure matches the desired boost pressure.

4 Claims, 4 Drawing Sheets

CONTROL SYSTEM AND METHOD FOR TURBOCHARGED THROTTLED ENGINE

BACKGROUND OF THE INVENTION

The present invention relates to a control system and method for controlling a turbo-charged throttled engine which consumes fuels such as gasoline, natural gas, LPG, hydrogen.

Heavy duty throttled engines, such as natural gas engines, are turbo-charged in order achieve diesel-like performance and power density. Such engines use fuel and air regulating devices which are controlled by the engine control unit (ECU). If the load on such an engine is rapidly reduced while the engine is operating in a highly boosted condition, this can dramatically reduce the flow rate through the turbocharger compressor over a short period of time. This results in a compressor surge condition, which can reduce turbocharger lifetime and produce objectionable noise.

SUMMARY

Accordingly, an object of this invention is to provide a system for reducing turbocharger surge in an engine.

This and other objects are achieved by the control system of the present invention. The control system functions with a turbo-charged throttled engine having intake air compressor and an exhaust turbine which receives engine exhaust. The control system includes an air throttle between the compressor and the engine and a wastegate communicated with engine exhaust upstream and downstream from the turbine. The control system generates a desired air mass value per engine stroke value as a function of a desired fuel flow amount and a stored a compressor surge characteristic. The control system generates a desired manifold air pressure value as a function of the desired air mass value and sensed engine parameters. The control system controls the air throttle and the wastegate so that the actual manifold air pressure matches the desired manifold air pressure. This system eliminates turbocharger surge and its effect on turbocharger durability. By eliminating turbocharger surge, the objectionable noise noticed by the operator during load reduction transients is also eliminated or greatly reduced. A further advantage is elimination of turbocharger overspeed conditions which can be experienced during operation at high altitudes which also affects turbocharger durability. This strategy differs from the prior art in that it modulates the air controls to prevent transient surge and actively identifies and prevents turbocharger overspeed conditions.

DETAILED DESCRIPTION

Figure 1:
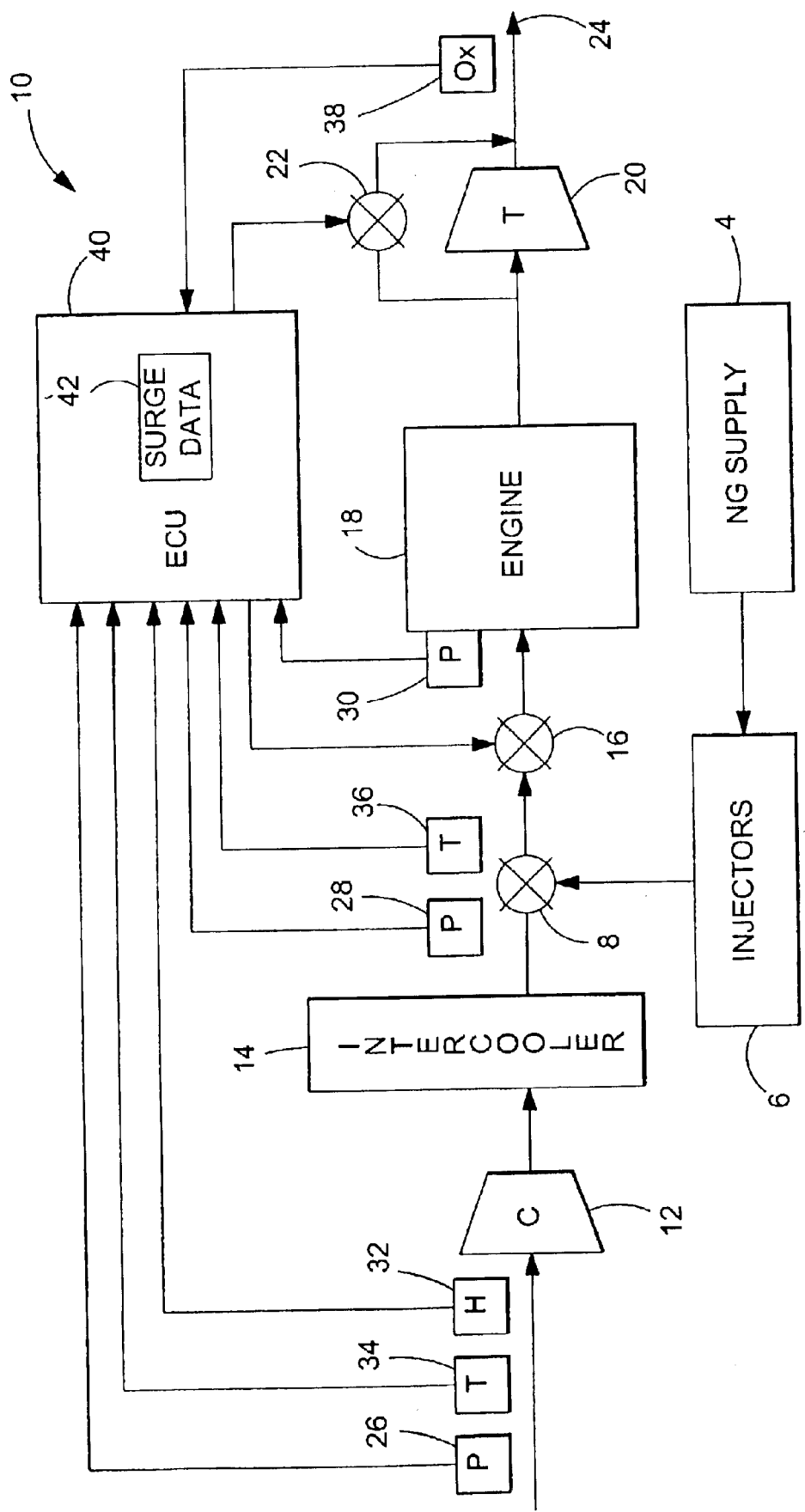
FIG. 1 is a schematic block diagram of a turbo-charged natural gas engine with a control system according to the present invention.
Figure 4:
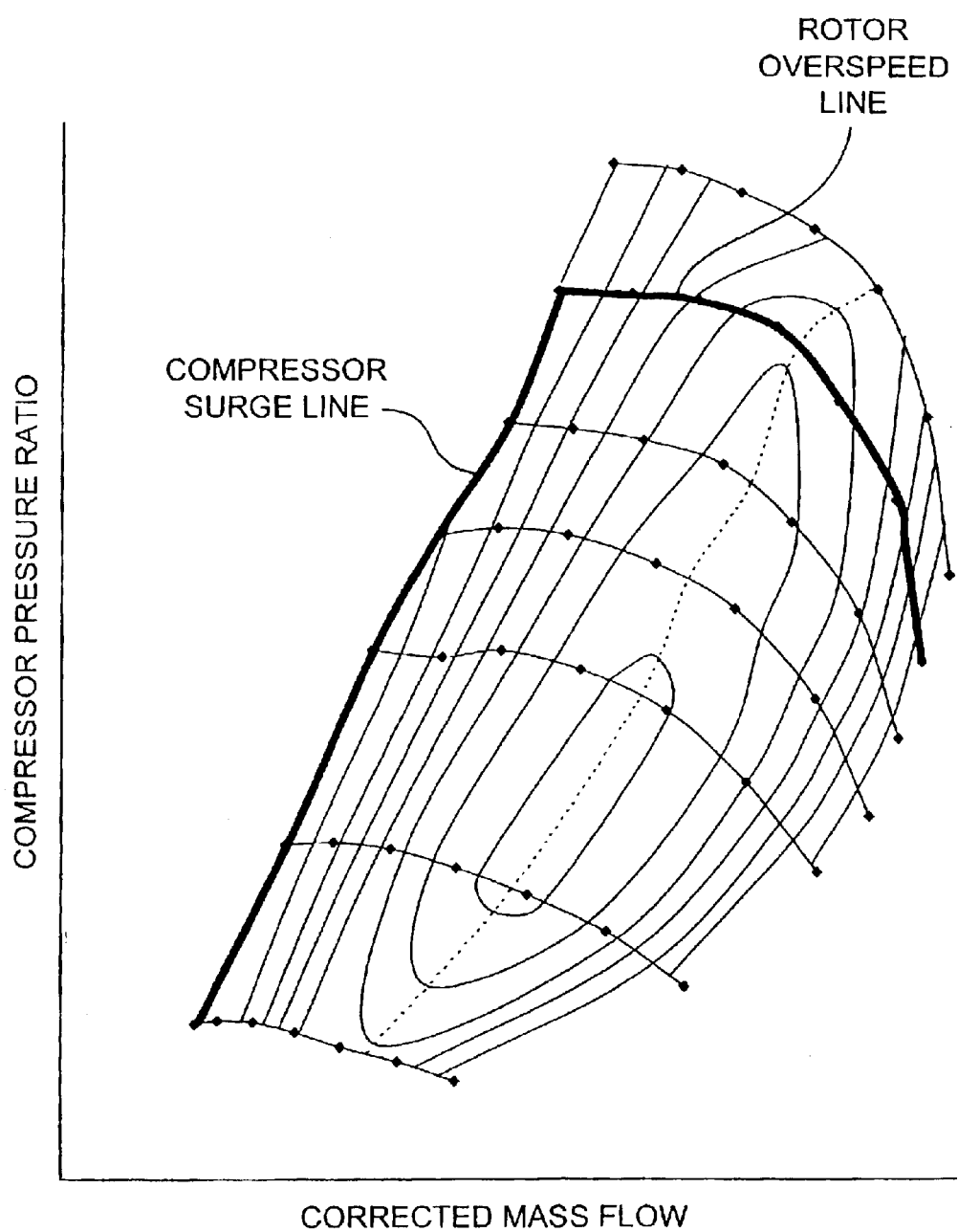
FIG. 4 is a sample turbocharger compressor map including a compressor surge line and a rotor overspeed line.

Referring to FIG. 1, a turbo-charged natural gas engine system 10 includes a turbocharger compressor 12 which receives intake air and provides pressure boosted air to an intercooler 14, and then via an air throttle 16 to the natural gas engine 18. A natural gas supply 4 supplies fuel to an injector unit 6, which in turn, supplies fuel to an air/fuel mixer 8. Engine exhaust flows from engine 18 to a turbocharger turbine 20 and to a wastegate valve 22, and from both turbine 20 and wastegate valve 22 to exhaust 24. An air pressure sensor 26 senses absolute air pressure at an intake of the compressor 12. A boost air pressure sensor 28 senses air pressure at an outlet of the intercooler 14. An intake manifold pressure sensor 30 senses air pressure at the intake manifold (not shown) of the engine 18. A humidity sensor 32 senses intake air humidity. A temperature sensor 34 senses intake air temperature. A temperature sensor 36 senses manifold air temperature upstream of air throttle 16. An oxygen sensor 38, such as a known commercially available universal exhaust gas oxygen sensor (UEGO) senses oxygen in the exhaust 24. An electronic control unit ECU 40 receives the signals from pressure sensors 26–38 and controls the air throttle 16 and the wastegate valve 22 as a function thereof. Compressor surge characteristic data 42, such as shown in FIG. 4, is stored in a memory (not shown) of the ECU 40.

Figure 2:
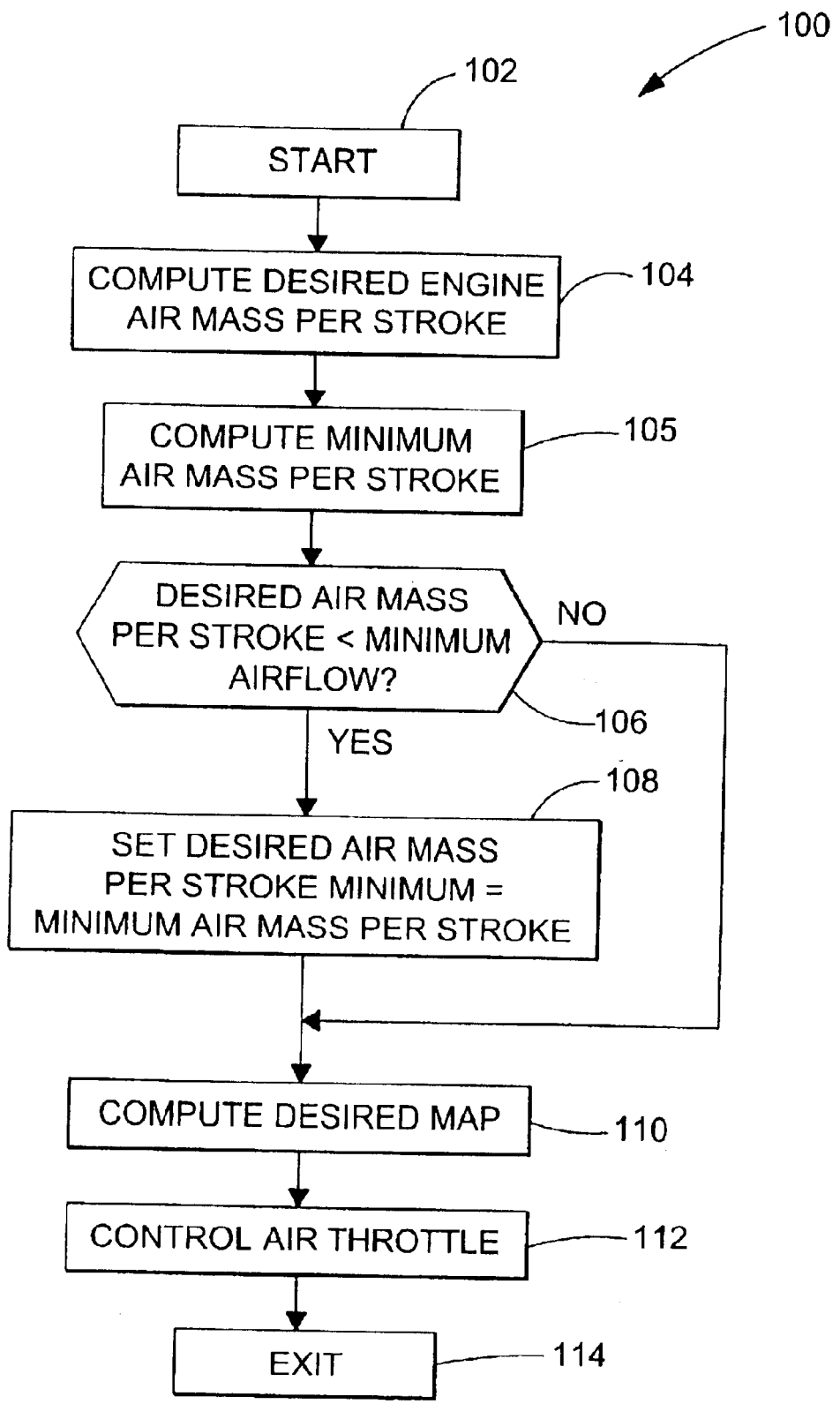
FIGS. 2 and 3 are logic flow diagrams of algorithms executed by the electronic control unit of the present invention of FIG. 1.
Figure 3:
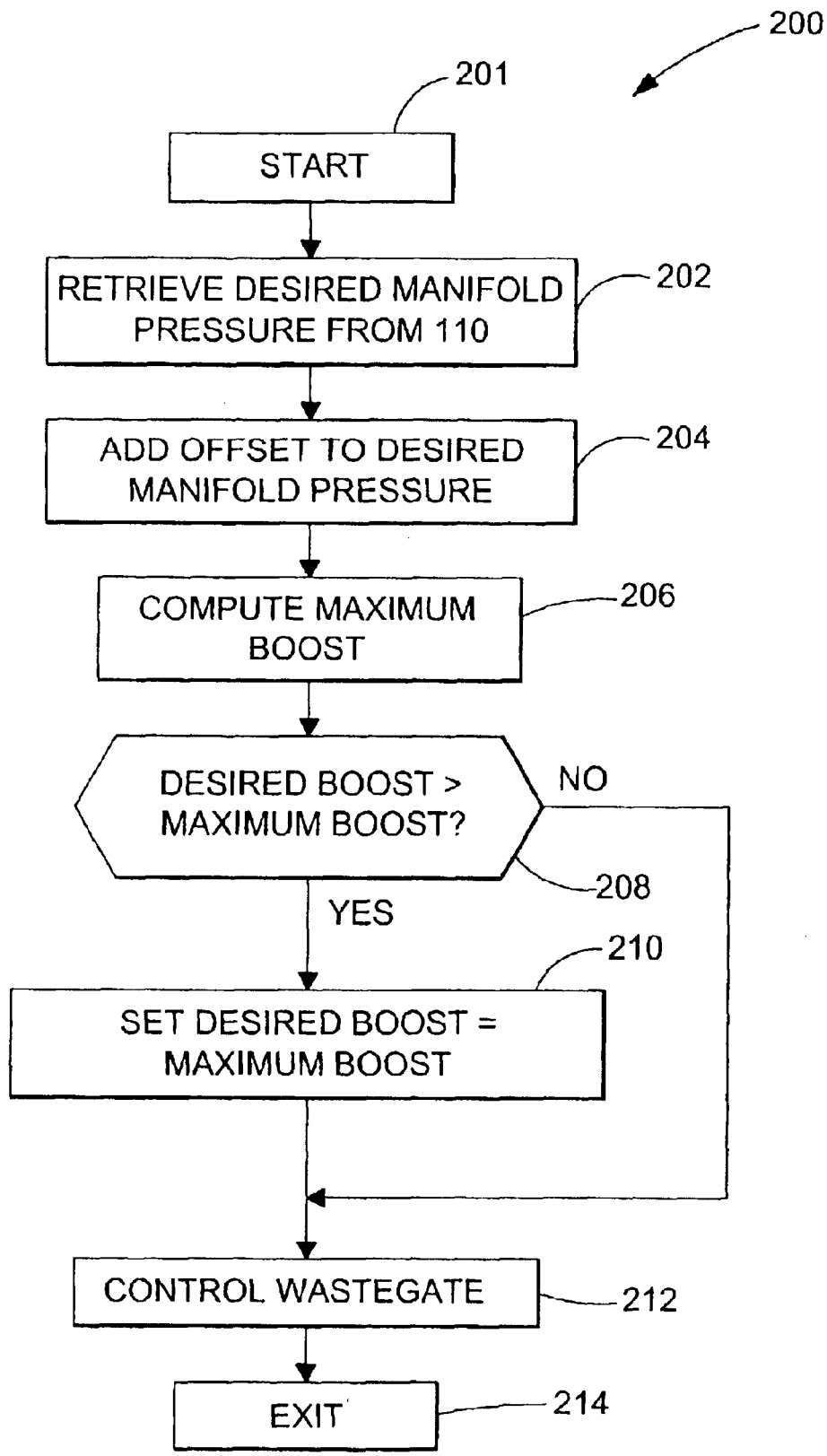

The ECU 40 periodically, such as once every 5 milliseconds, executes the algorithms 100 FIG. 2. The ECU 40 periodically, such as once every 20 milliseconds, executes the algorithm 200 represented by FIG. 3. The conversion of these flow charts into a standard language for implementing the algorithms described by the flow charts in a digital computer or microprocessor, will be evident to one with ordinary skill in the art.

Referring now to FIG. 2, a transient compressor surge compensation routine 100 starts at step 102. In step 104 determines a desired air mass per cylinder stroke. This desired air mass value may be derived by converting a desired fuel flow amount from an engine governor (not shown, but conventionally implemented by the ECU 40) into a corresponding air mass required to combust that amount of fuel. In step 105 a minimum air mass per stroke required to avoid engine surge is determined. The minimum air mass value represents an air flow below which a compressor surge condition would occur. The minimum air mass value is determined by computing the pressure across the compressor 12 and relating this pressure to the stored compressor surge characteristics 42. Such a compressor surge characteristics 42 are normally supplied with a commercially available compressor.

In step 106 the desired engine air mass value is compared to the minimum air mass value from step 105. If the desired engine air mass value is less than the minimum air mass value, the routine proceeds to step 108 which sets the desired engine air mass value equal to the minimum air mass value. If the desired engine air mass value is not less than the minimum air mass value, the routine proceeds to step 110.

Step 110 computes a desired engine manifold air pressure (MAP) value by using a two-part process. First, a Desired MAP value is calculated using the following equation:

Desired MAP=Number of Cylinders×Desire Air Mass×(1 +Fuel Air ratio+Specific Humidity)/Flow Term, where Desired Air Mass is the value from steps 104 or 108, where Fuel Air Ratio is derived from the signal from sensor 38, where Specific Humidity is derived from the signals from sensors 26, 32 and 34.

Flow Term is 1000×engine displacement×VolEff/R×MAT, where VolEff is the volumetric efficiency of the engine, R is the gas constant, and MAT is the absolute manifold air temperature from temperature sensor 36.

Step 112 then opens or closes the air throttle 16 to make the air pressure downstream of throttle 16, as sensed by pressure sensor 30, match the computed desired MAP. Algorithm 100 ends and exits at step 114.

Algorithm 200 starts at step 201. Step 202 retrieves the desired MAP value from step 110 of algorithm 100. Step 204 adds an offset to the desired MAP value to produce a desired boost pressure value. The offset is obtained as a function of engine speed and desired mass air from a table stored in a memory of the ECU 40. The offset represents a desired pressure drop across the air throttle and is experimentally determined to balance transient response, efficiency and controllability.

Step 206 computes a maximum allowable pressure boost to avoid compressor surge or overspeed. This is computed in a known manner using the air flow rate and the known stored compressor characteristics 42 which includes data representing lines of constant compressor rotor speed and the compressor surge line, where air flow rate equals air mass per stroke times the number of cylinder strokes per second. Such a characteristics are illustrated by FIG. 4.

In step 208 the desired pressure boost value is compared to the maximum allowable pressure boost value from step 206. If the desired pressure boost value is greater than the maximum allowable pressure boost value, the routine proceeds to step 210 which sets the desired pressure boost value equal to the maximum allowable pressure boost value. If the desired pressure boost value is not greater than the maximum allowable pressure boost value, the routine proceeds to step 212.

Step 212 opens or closes the wastegate 22 so that the actual boost pressure, as sensed by pressure sensor 28, will match the desired boost pressure. Algorithm 200 ends and exits at step 214.

Using the surge characteristic 42 of the turbocharger compressor 12 stored in the ECU 40, the control system 10 determines when the engine is operating near the surge region of the compressor 12. The ECU 40 can then control the throttle 16 and wastegate 22 such that the surge condition is avoided. Similarly, with compressor data for the maximum desired turbocharger speed stored in the ECU 40, the ECU 40 can determine when turbocharger shaft speeds are approaching maximum desirable levels and the wastegate 22 is opened to prevent these speeds from being exceeded.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A method of controlling a turbo-charged throttled engine having an intake air compressor, an exhaust turbine which receives engine exhaust, an air throttle between the compressor and the engine, and a wastegate communicated with engine exhaust upstream and downstream from the turbine, the method comprising:

generating a desired air mass value per engine stroke value as a function of a desired fuel flow amount and a stored compressor surge characteristics;

determining a minimum air mass per stroke required to avoid engine surge;

comparing the desired engine air mass value to the minimum air mass value;

setting the desired engine air mass value equal to the minimum air mass value if the desired engine air mass value is less than the minimum air mass value;

if the desired engine air mass value is not less than the minimum air mass value, generating a desired manifold air pressure value as a function of the desired air mass value and sensed engine parameters; and controlling the air throttle so that an actual manifold air pressure matches the desired manifold air pressure.

2. The method of claim 1, further comprising:

deriving a Fuel Air Ratio value from an oxygen sensor in the exhaust;

deriving a Specific Humidity value from an air pressure sensor, a humidity sensor and a temperature sensor;

determining an absolute manifold air temperature (MAT) from a temperature sensor; and computing the desired engine manifold air pressure (MAP) value using the following equation:

desired MAP=Number of Cylinders×desired air mass×(1+Fuel Air ratio+Specific Humidity)/Flow Term, where Flow Term=1000×engine displacement×VolEff/R× MAT, and where VolEff is the volumetric efficiency of the engine, and R is the gas constant.

3. The method of claim 1, further comprising:

generating a desired pressure boost value as a function of the desired manifold pressure value and the stored compressor surge characteristic; and controlling the wastegate so that an actual boost pressure matches the desired boost pressure.

4. A method of controlling a turbo-charged throttled engine having an intake air compressor, an exhaust turbine which receives engine exhaust, an air throttle between the compressor and the engine, and a wastegate communicated with engine exhaust upstream and downstream from the turbine, the method comprising:

generating a desired air mass value per engine stroke value as a function of a desired fuel flow amount and stored compressor surge characteristics;

generating a desired pressure boost value as a function of the desired manifold pressure value and the stored compressor surge characteristics;

generating a desired manifold air pressure value as a function of the desired air mass value and sensed engine parameters;

determining an offset value representing a desired pressure drop across the air throttle;

adding the offset value to the desired manifold air pressure value to produce a desired boost pressure value;

computing a maximum allowable pressure boost to avoid compressor surge or overspeed;

comparing the desired pressure boost value to the maximum allowable pressure boost value;

if the desired pressure boost value is greater than the maximum allowable pressure boost value, then setting the desired pressure boost value equal to the maximum allowable pressure boost value;

controlling the wastegate so that an actual boost pressure matches the desired boost pressure; and controlling the air throttle so that an actual manifold air pressure matches the desired manifold air pressure.

* * * * *